US012732622B2

(12) United States Patent
Chiang et al.

(10) Patent No.: US 12,732,622 B2
(45) Date of Patent: Sep. 8, 2026

(54) METHOD AND APPARATUS FOR CROSS COMPONENT LINEAR MODEL FOR INTER PREDICTION IN VIDEO CODING SYSTEM

(71) Applicant: MEDIATEK INC., Hsinchu City (TW)

(72) Inventors: Man-Shu Chiang, Hsinchu City (TW); Olena Chubach, San Jose, CA (US); Yu-Ling Hsiao, Hsinchu City (TW); Chia-Ming Tsai, Hsinchu City (TW); Chun-Chia Chen, Hsinchu City (TW); Chih-Wei Hsu, Hsinchu City (TW); Tzu-Der Chuang, Hsinchu City (TW); Ching-Yeh Chen, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/720,901

(22) PCT Filed: Dec. 20, 2022

(86) PCT No.: PCT/CN2022/140434

§ 371 (c)(1),
(2) Date: Jun. 17, 2024

(87) PCT Pub. No.: WO2023/116716

PCT Pub. Date: Jun. 29, 2023

(65) Prior Publication Data

US 2025/0080756 A1 Mar. 6, 2025

Related U.S. Application Data

(60) Provisional application No. 63/291,999, filed on Dec. 21, 2021.

(51) Int. Cl.
*H04N 19/159* (2014.01)
*H04N 19/176* (2014.01)
*H04N 19/186* (2014.01)

(52) U.S. Cl.
CPC ......... *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS 11,949,901 B2 * 4/2024 Misra ..................... H04N 19/48
11,985,309 B2 5/2024 Tang
(Continued)

FOREIGN PATENT DOCUMENTS

WO 2018061588 A1 4/2018
WO 2020096877 A1 5/2020
(Continued)

OTHER PUBLICATIONS

International Search Report and Written Opinion dated Mar. 3, 2023, issued in application No. PCT/CN2022/140434.
(Continued)

*Primary Examiner* — Talha M Nawaz
(74) *Attorney, Agent, or Firm* — McClure, Qualey & Rodack, LLP

(57) ABSTRACT

A method and apparatus for inter prediction in video coding system are disclosed. According to the method, one or more model parameters of one or more cross-color models for the second-color block are determined. Then, cross-color predictors for the second-color block are determined, wherein one cross-color predictor value for the second-color block is generated for each second-color pixel of the second-color block by applying said one or more cross-color models to corresponding reconstructed or predicted first-color pixels. The input data associated with the second-color block is encoded using prediction data comprising the cross-color predictors for the second-color block at the encoder side, or (Continued)

the input data associated with the second-color block is decoded using the prediction data comprising the cross-color predictors for the second-color block at the decoder side.

14 Claims, 8 Drawing Sheets

(56) References Cited

U.S. PATENT DOCUMENTS

| | | | | |
|---|---|---|---|---|
| 11,985,332 | B2 * | 5/2024 | Li | H04N 19/176 |
| 12,010,316 | B2 * | 6/2024 | Li | H04N 19/159 |
| 2020/0128272 | A1 * | 4/2020 | Jangwon | H04N 19/157 |
| 2020/0162728 | A1 | 5/2020 | Van der Auwera | |
| 2021/0176480 | A1 | 6/2021 | Choi | |
| 2022/0070441 | A1 * | 3/2022 | Xiu | H04N 19/103 |
| 2022/0078405 | A1 * | 3/2022 | Francois | H04N 19/503 |
| 2023/0300351 | A1 | 9/2023 | Francois | |
| 2024/0323397 | A1 * | 9/2024 | Bae | H04N 19/70 |
| 2024/0406407 | A1 | 12/2024 | Jeon | |
| 2025/0024078 | A1 | 1/2025 | Hashimoto | |

FOREIGN PATENT DOCUMENTS

| | | | |
|---|---|---|---|
| WO | 2020142279 | A1 | 7/2020 |
| WO | 2021238540 | A1 | 12/2021 |
| WO | 2021244935 | A1 | 12/2021 |
| WO | 2023241637 | A9 | 1/2025 |

OTHER PUBLICATIONS

Chinese language office action dated Oct. 12, 2023, issued in application No. TW 111149215.

Extended European Search Report dated Oct. 2, 2025, issued in application No. EP 22910028.4.

Zhang, K., et al.; "Multi-model based cross-component linear model chroma intra-prediction for video coding;" VCIP; Dec. 2017; pps.l 1-4.

English language office action dated Jun. 22, 2026, issued in U.S. Appl. No. 18/873,524.

* cited by examiner

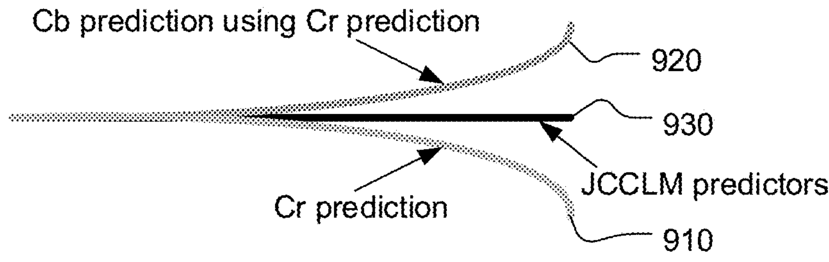
*Fig. 9*
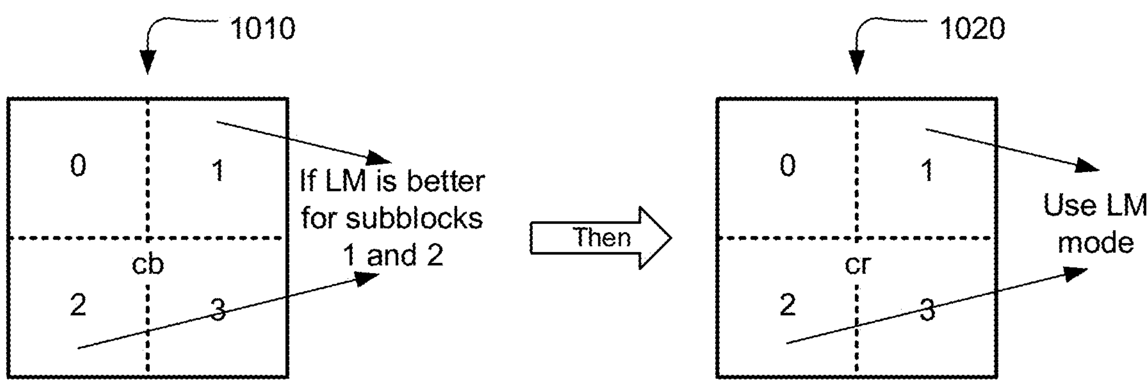
*Fig. 10*
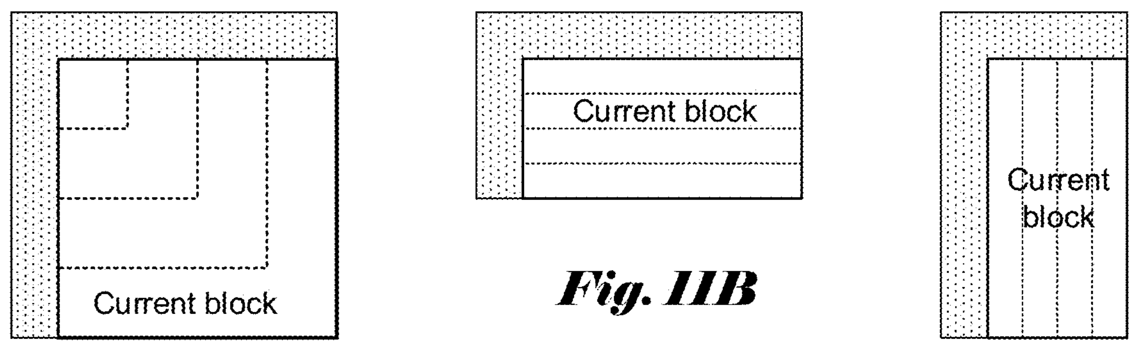
*Fig. 11A*
*Fig. 11B*
*Fig. 11C*

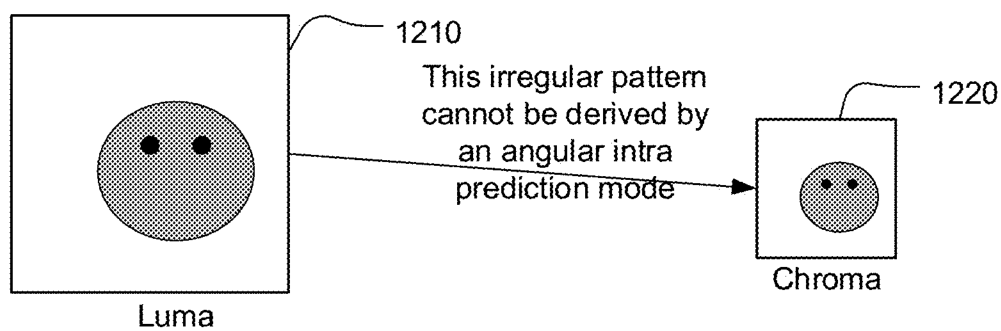
Fig. 12
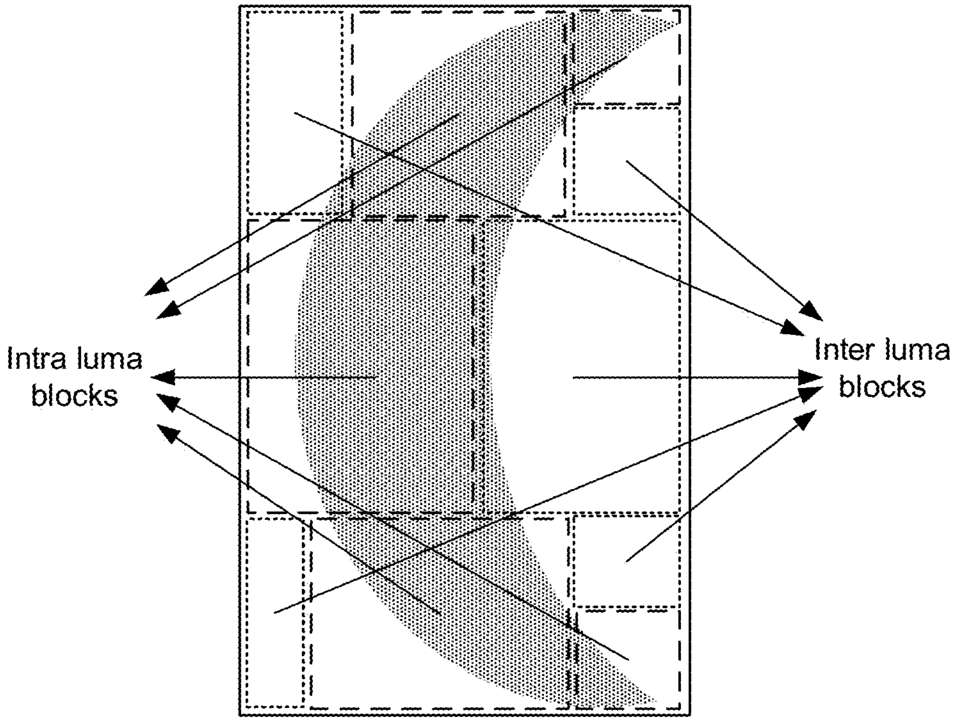
Fig. 13
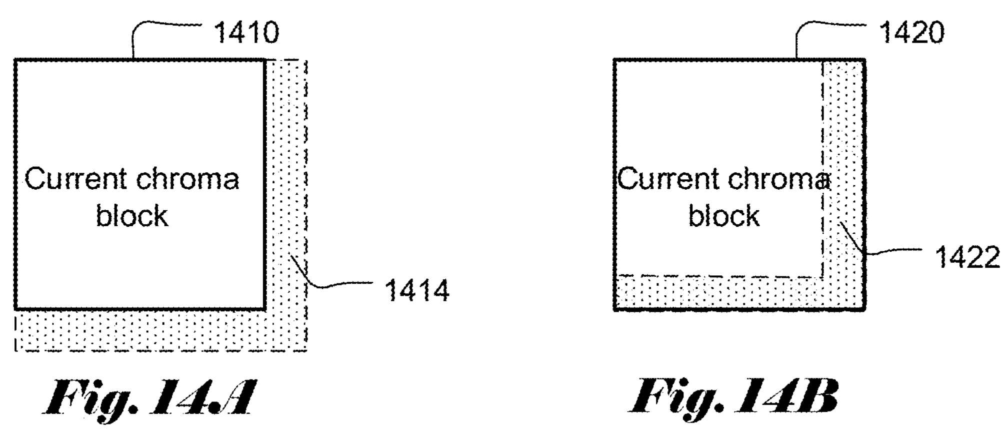
Fig. 14A
Fig. 14B

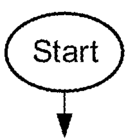

Receiving input data associated with a current block comprising a first-color block and a second-color block, wherein the input data comprises pixel data for the current block to be encoded at an encoder side or encoded data associated with the current block to be decoded at a decoder side, and wherein the first-color block is coded in a non-intra block mode

1510

Determining one or more model parameters of one or more cross-color models for the second-color block

1520

Determining cross-color predictors for the second-color block, wherein one cross-color predictor value for the second-color block is generated for each second-color pixel of the second-color block by applying said one or more cross-color models to corresponding reconstructed or predicted first-color pixels

1530

Encoding the input data associated with the second-color block using prediction data comprising the cross-color predictors for the second-color block at the encoder side or decoding the input data associated with the second-color block using the prediction data comprising the cross-color predictors for the second-color block at the decoder side

1540

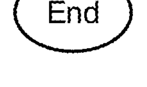

*Fig. 15*

METHOD AND APPARATUS FOR CROSS COMPONENT LINEAR MODEL FOR INTER PREDICTION IN VIDEO CODING SYSTEM

CROSS REFERENCE TO RELATED APPLICATIONS

The present invention is a non-Provisional Application of and claims priority to U.S. Provisional Patent Application No. 63/291,999, filed on Dec. 21, 2021. The U.S. Provisional Patent Application is hereby incorporated by reference in its entirety.

FIELD OF THE INVENTION

The present invention relates to video coding system. In particular, the present invention relates to a new video coding tool for inter prediction using cross-component linear model in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video encoding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264, VVC or any other video coding standard.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Trec Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. In the present disclosure, various new coding tools are presented to improve the coding efficiency beyond the VVC. In particular, coding tools related to CCLM are disclosed.

BRIEF SUMMARY OF THE INVENTION

A method and apparatus for inter prediction in video coding system are disclosed. According to the method, input data associated with a current block comprising a first-color block and a second-color block are received, wherein the input data comprises pixel data for the current block to be encoded at an encoder side or encoded data associated with the current block to be decoded at a decoder side, and wherein the first-color block is coded in a non-intra block mode. One or more model parameters of one or more cross-color models for the second-color block are determined. Then, cross-color predictors for the second-color block are determined, wherein one cross-color predictor value for the second-color block is generated for each second-color pixel of the second-color block by applying said one or more cross-color models to corresponding reconstructed or predicted first-color pixels. The input data associated with the second-color block is encoded using prediction data comprising the cross-color predictors for the second-color block at the encoder side, or the input data associated with the second-color block is decoded using the prediction data comprising the cross-color predictors for the second-color block at the decoder side.

In one embodiment, the prediction data further comprises second-color inter prediction data based on reconstructed second-color data in a previously coded reference picture. In one embodiment, the prediction data are generated as a weighted sum of the cross-color predictors and the second-color inter prediction data. In one embodiment, weighting for the weighted sum is determined according to neighboring coding information, sample position, block width, block height, block area, block mode or a combination thereof. In one embodiment, a weight of the cross-color predictors is higher than the weight of the second-color inter prediction data if a block size is smaller than a threshold. In another embodiment, a weight of the cross-color predictors is higher than the weight of the second-color inter prediction data if a majority of neighboring blocks of the current block is coded in an intra mode. In one embodiment, the weighting corresponds to fixed weights for the current block.

In one embodiment, the prediction data further comprises one or more hypotheses of predictions generated by one or more other cross-color models. In one embodiment, at least one of the cross-color models is a linear model (LM).

In one embodiment, the model parameters are determined based on neighboring reconstructed first-color pixels of a collocated first-color block associated with the second-color block and neighboring reconstructed second-color pixels of the second-color block. In one embodiment, the neighboring reconstructed first-color pixels of the collocated first-color block correspond to top neighboring samples of the collocated first-color block, left neighboring samples of the collocated first-color block, or both.

In one embodiment, the prediction data is selected from a pre-defined set including the cross-color predictors.

In one embodiment, the current block corresponds to an inter CU (Coding Unit) or corresponds to IBC (Intra Block Copy) CU.

In one embodiment, the prediction data further comprises second-color prediction data based on IBC (Intra Block Copy) mode.

In one embodiment, the first-color block corresponds to a luma block and the second-color block corresponds to a chroma block.

BRIEF DESCRIPTION OF THE DRAWINGS

FIG. 9 illustrates an example of the relationship between the cr prediction, cb prediction and JCCLM predictors.

FIG. 10 illustrates an example of Adaptive Intra-mode selection, where the chroma block is divided into 4 sub-blocks.

FIGS. 11A-C illustrate some possible ways to partition the current block and the weight selection for prediction from CCLM associated with these partitions.

FIG. 12 illustrates an example of Cross-CU LM, where the block has an irregular pattern that no angular intra prediction can provide a good prediction.

FIG. 13 illustrates an example that a luma picture area associated with a node contains irregular patterns and the picture area is divided into various blocks for applying inter or intra prediction.

FIGS. 14A-B illustrate examples of using LM mode to generate the right-bottom region within (FIG. 14A) or outside (FIG. 14B) the current block.

FIG. 15 illustrates a flowchart of an exemplary video coding system that utilizes cross-color linear model for inter mode according to an embodiment of the present invention.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Intra Mode Coding with 67 Intra Prediction Modes

Figure 2:
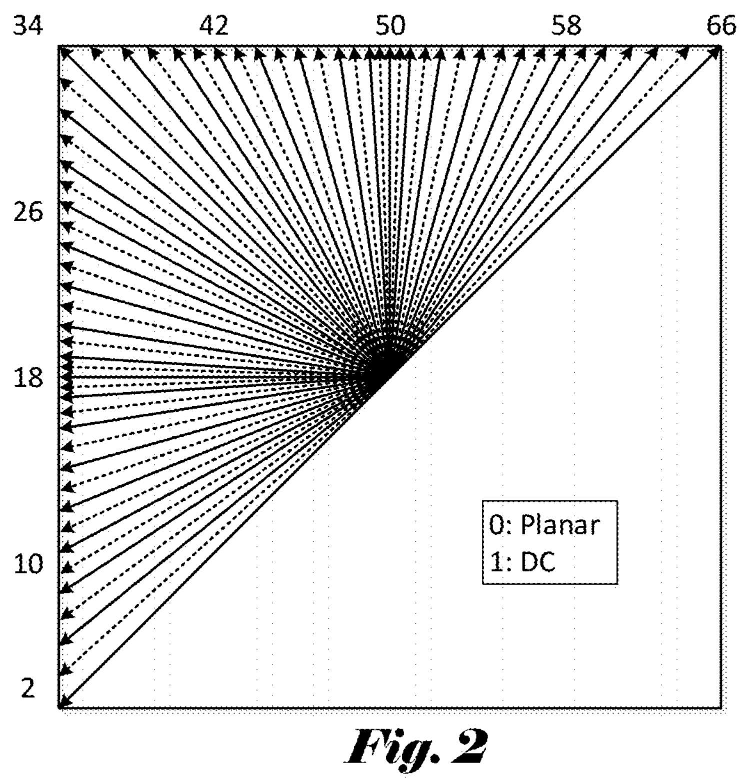
FIG. 2 illustrates an example of directional (angular) modes for Intra prediction.

To capture the arbitrary edge directions presented in natural video, the number of directional intra modes in VVC is extended from 33, as used in HEVC, to 65. The new directional (angular) modes not in HEVC are depicted as red dotted arrows in FIG. 2, and the planar and DC modes remain the same. These denser directional intra prediction modes are applied for all block sizes and for both luma and chroma intra predictions.

To keep the complexity of the most probable mode (MPM) list generation low, an intra mode coding method with 6 MPMs is used by considering two available neighboring intra modes. The following three aspects are considered to construct the MPM list:

Default intra modes

Neighboring intra modes

Derived intra modes

Multiple Reference Line Intra Prediction

Figure 3:
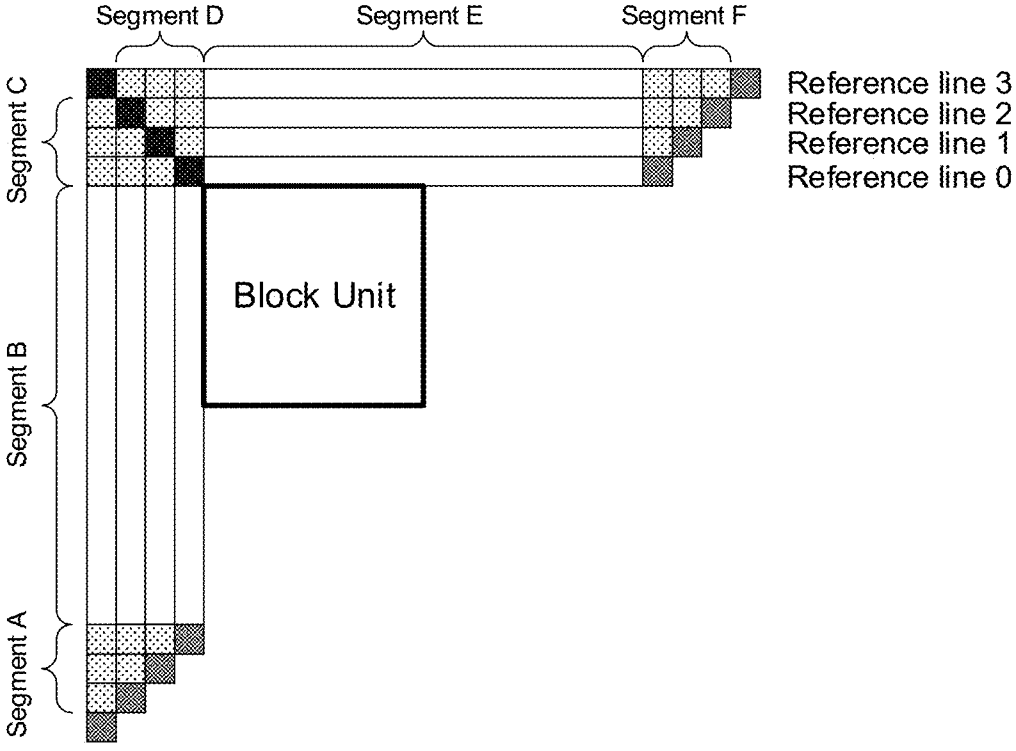
FIG. 3 illustrates an example of Multiple Reference Line (MRL) intra prediction, where 4 reference lines are used for intra prediction.

Multiple reference line (MRL) intra prediction uses more reference lines for intra prediction. In FIG. 3, an example of 4 reference lines is depicted, where the samples of segments A and F are not fetched from reconstructed neighboring samples but padded with the closest samples from segments B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line idx, which is greater than 0, only include additional reference line modes in MPM list and only signal mpm index without remaining mode. The reference line index is signaled before intra prediction modes, and Planar mode is excluded from intra prediction modes in case that a nonzero reference line index is signaled.

MRL is disabled for the first line of blocks inside a CTU to prevent using extended reference samples outside the current CTU line. Also, PDPC (Position-Dependent Prediction Combination) is disabled when an additional line is used. For MRL mode, the derivation of DC value in DC intra prediction mode for non-zero reference line indices is aligned with that of reference line index 0. MRL requires the storage of 3 neighboring luma reference lines with a CTU to generate predictions. The Cross-Component Linear Model (CCLM) tool also requires 3 neighboring luma reference lines for its down-sampling filters. The definition of MRL to use the same 3 lines is aligned with CCLM to reduce the storage requirements for decoders.

Intra Sub-Partitions

Figure 4A:
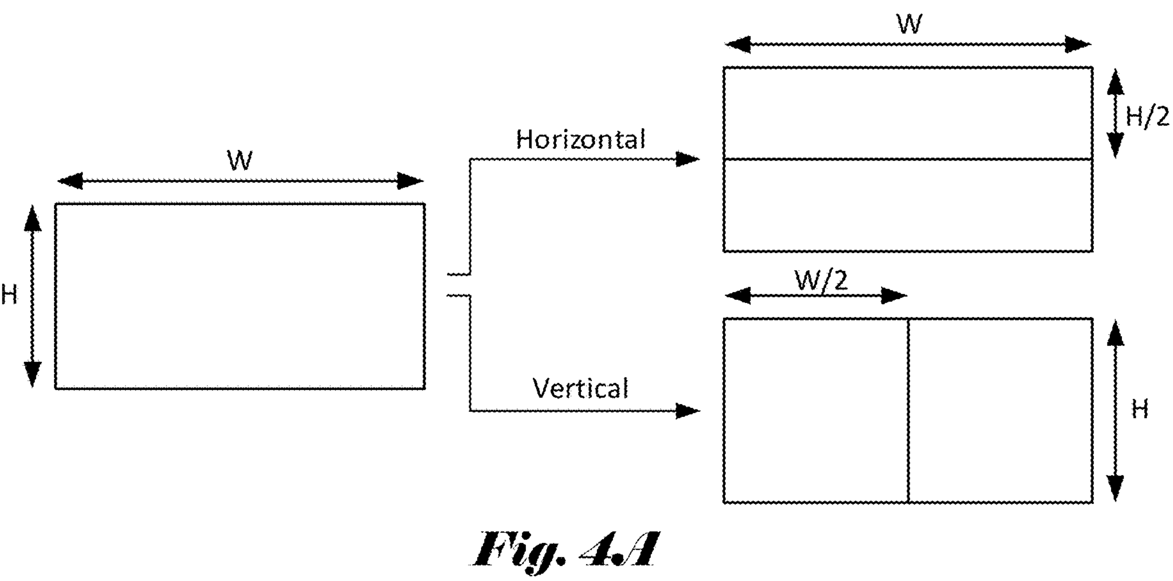
FIG. 4A illustrates an example of Intra Sub-Partition (ISP), where a block is partitioned in two subblocks horizontally or vertically.
Figure 4B:
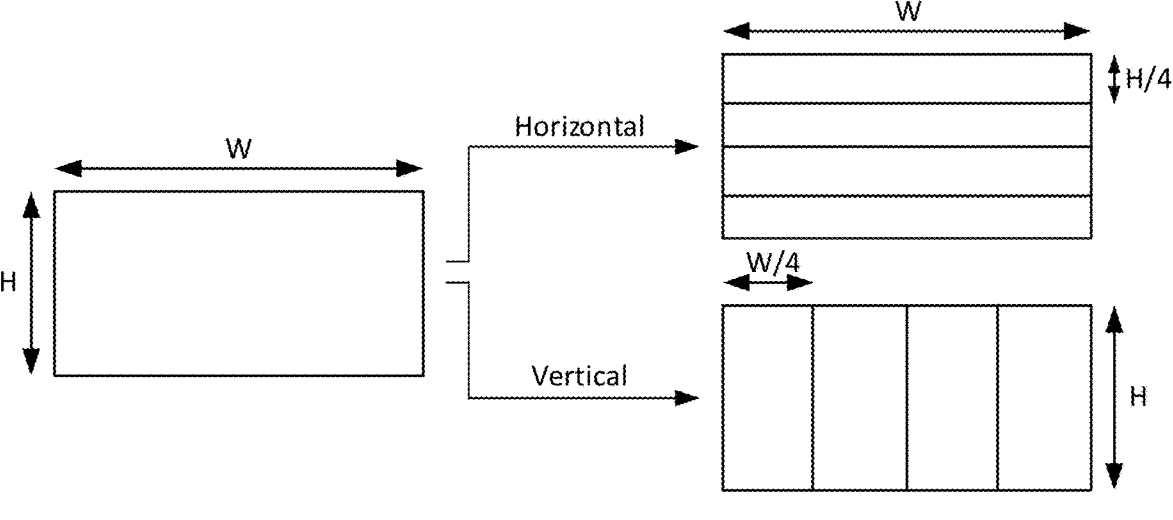
FIG. 4B illustrates an example of Intra Sub-Partition (ISP), where a block is partitioned in four subblocks horizontally or vertically.

The intra sub-partitions (ISP) divides luma intra-predicted blocks vertically or horizontally into 2 or 4 sub-partitions depending on the block size. For example, the minimum block size for ISP is 4×8 (or 8×4). If block size is greater than 4×8 (or 8×4), then the corresponding block is divided by 4 sub-partitions. It has been noted that the M×128 (with M≤64) and 128×N (with N≤64) ISP blocks could generate a potential issue with the 64×64 VDPU (Virtual Decoder Pipeline Unit). For example, an M×128 CU in the single tree case has an M×128 luma TB and two corresponding $$\frac{M}{2} \times 64$$

chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP. Hence, these two cases are an issue for the 64×64 decoder pipeline. For this reason, the CU size that can use ISP is restricted to a maximum of 64×64. FIG. 4A and FIG. 4B shows examples of the two possibilities. All sub-partitions fulfil the condition of having at least 16 samples.

In ISP, the dependence of 1×N and 2×N subblock prediction on the reconstructed values of previously decoded 1×N and 2×N subblocks of the coding block is not allowed so that the minimum width of prediction for subblocks becomes four samples. For example, an 8×N (N>4) coding block that is coded using ISP with vertical split is partitioned into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks compared to processing 4×4 regular-coded intra blocks.

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed consecutively. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode.

Matrix Weighted Intra Prediction

Figures 5, 6:
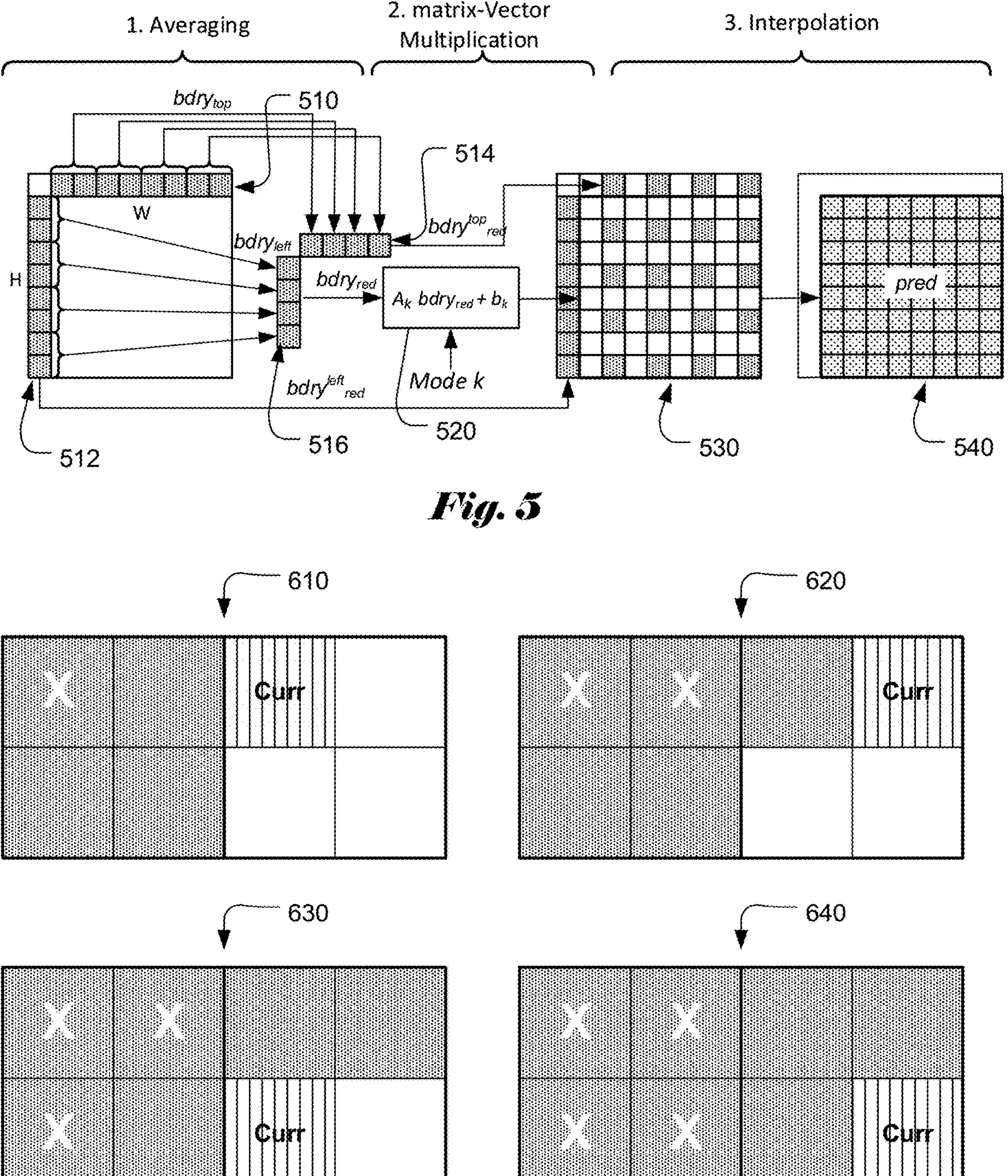
FIG. 5 illustrates an example of processing flow for Matrix weighted intra prediction (MIP).
FIG. 6 illustrates the reference region of IBC Mode, where each block represents 64×64 luma sample unit and the reference region depends on the location of the current coded CU.

Matrix weighted intra prediction (MIP) method is a newly added intra prediction technique in VVC. For predicting the samples of a rectangular block of width W and height H, matrix weighted intra prediction (MIP) takes one line of H reconstructed neighboring boundary samples left of the block and one line of W reconstructed neighboring boundary samples above the block as input. If the reconstructed samples are unavailable, they are generated as it is done in the conventional intra prediction. The generation of the prediction signal is based on the following three steps, i.e., averaging, matrix vector multiplication and linear interpolation as shown in FIG. 5. One line of H reconstructed neighboring boundary samples 512 left of the block and one line of W reconstructed neighboring boundary samples 510 above the block are shown as dot-filled small squares. After the averaging process, the boundary samples are down-sampled to top boundary line 514 and left boundary line 516. The down-sampled samples are provided to the matric-vector multiplication unit 520 to generate the down-sampled prediction block 530. An interpolation process is then applied to generate the prediction block 540.

Averaging Neighboring Samples

Among the boundary samples, four samples or eight samples are selected by averaging based on the block size and shape. Specifically, the input boundaries $bdry^{top}$ and $bdry^{left}$ are reduced, to smaller boundaries $$bdry_{red}^{top} \text{ and } bdry_{red}^{left}$$

by averaging neighboring boundary samples according to a predefined rule depending on block size. Then, the two reduced boundaries $$bdry_{red}^{top} \text{ and } bdry_{red}^{left}$$

are concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6. \end{cases}$$

Matrix Multiplication

A matrix vector multiplication, followed by addition of an offset, is carried out with the averaged samples as an input. The result is a reduced prediction signal on a subsampled set of samples in the original block. Out of the reduced input vector $bdry_{red}$, a reduced prediction signal $pred_{red}$, which is a signal on the down-sampled block of width $W_{red}$ and height $H_{red}$ is generated. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

The reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns for W=H=4 and 8 columns for all other cases. b is a vector of size $W_{red} \cdot H_{red}$. The matrix A and the offset vector b are taken from one of the sets $S_0$, $S_1$, $S_2$. One defines an index idx=idx(W,H) as follows:

$$idx(W, H) = \begin{cases} 0 & \text{for } W = H = 4 \\ 1 & \text{for } \max(W, H) = 8 \\ 2 & \text{for } \max(W, H) > 8. \end{cases}$$

Here, each coefficient of the matrix A is represented with 8-bit precision. The set $S_0$ consists of 16 matrices $$A_0^i,$$

$i \in \{0, \ldots, 15\}$, each of which has 16 rows and 4 columns, and 16 offset vectors $$b_0^i,$$

$i \in \{0, \ldots, 16\}$, each of size 16. Matrices and offset vectors of that set are used for blocks of size 4×4. The set $S_1$ consists of 8 matrices $$A_1^i,$$

$i \in \{0, \ldots, 7\}$, each of which has 16 rows and 8 columns, and 8 offset vectors $$b_1^i,$$

$i \in \{0, \ldots, 7\}$, each of size 16. The set $S_2$ consists of 6 matrices $$A_2^i,$$

$i \in \{0, \ldots, 5\}$, each of which has 64 rows and 8 columns, and 6 offset vectors $$b_2^i,$$

$i \in \{0, \ldots, 5\}$, each of size 64.

Interpolation

The prediction signal at the remaining positions is generated from the prediction signal on the subsampled set by linear interpolation, which is a single-step linear interpolation in each direction. The interpolation is performed firstly in the horizontal direction and then in the vertical direction, regardless of block shape or block size.

Signaling of MIP Mode and Harmonization with Other Coding Tools

For each Coding Unit (CU) in intra mode, a flag indicating whether an MIP mode is to be applied or not is sent. If an MIP mode is to be applied, MIP mode (predModeIntra) is signaled. For an MIP mode, a transposed flag (isTransposed), which determines whether the mode is transposed, and MIP mode Id (modeId), which determines which matrix is to be used for the given MIP mode is derived as follows $$isTransposed = predModeIntra \,\&1$$

$$modeId = predModeIntra >> 1$$

MIP coding mode is harmonized with other coding tools by considering following aspects:

- LFNST (Low-Frequency Non-Separable Transform) is enabled for MIP on large blocks. Here, the LFNST transforms of planar mode are used
- The reference sample derivation for MIP is performed exactly as for the conventional intra prediction modes
- For the up-sampling step used in the MIP-prediction, original reference samples are used instead of down-sampled ones
- Clipping is performed before up-sampling and not after up-sampling
- MIP is allowed up to 64×64 regardless of the maximum transform size
- The number of MIP modes is 32 for sizeId=0, 16 for sizeId=1 and 12 for sizeId=2

Intra Block Copy

Intra block copy (IBC) is a tool adopted in HEVC extensions on SCC (Screen Content Coding). It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector is rounded to integer precision as well. When combined with AMVR (Adaptive Motion Vector Resolution), the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return a valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signaled with a flag and it can be signaled as IBC AMVP (Advanced Motion Vector Prediction) mode or IBC skip/merge mode as follows:

- IBC skip/merge mode: a merge candidate index is used to indicate which of the block vectors in the list from neighboring candidate IBC coded blocks is used to predict the current block. The merge list consists of spatial, HMVP (History based Motion Vector Prediction), and pairwise candidates.
- IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

IBC Reference Region

To reduce memory consumption and decoder complexity, the IBC in VVC allows only the reconstructed portion of the predefined area including the region of current CTU and some region of the left CTU. FIG. 6 illustrates the reference region of IBC Mode, where each block represents 64×64 luma sample unit. Depending on the location of the current coded CU within the current CTU, the following applies:

- If the current block falls into the top-left 64×64 block of the current CTU (case 610 in FIG. 6), then in addition to the already reconstructed samples in the current CTU, it can also refer to the reference samples in the bottom-right 64×64 blocks of the left CTU, using current picture referencing (CPR) mode. (More details of CPR can be found in JVET-T2002 (Jianle Chen, et. al., "Algorithm description for Versatile Video Coding and Test Model 11 (VTM 11)", Joint Video Experts Team (JVET) of ITU-T SG 16 WP 3 and ISO/IEC JTC 1/SC 29, 20th Meeting, by teleconference, 7-16 Oct. 2020, Document: JVET-T2002)). The current block can also refer to the reference samples in the bottom-left 64×64 block of the left CTU and the reference samples in the top-right 64×64 block of the left CTU, using CPR mode.
- If the current block falls into the top-right 64×64 block of the current CTU (case 620 in FIG. 6), then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.
- If the current block falls into the bottom-left 64×64 block of the current CTU (case 630 in FIG. 6), then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.
- If current block falls into the bottom-right 64×64 block of the current CTU (case 640 in FIG. 6), it can only refer to the already reconstructed samples in the current CTU, using CPR mode.

This restriction allows the IBC mode to be implemented using local on-chip memory for hardware implementations.

Joint Coding of Chroma Residuals

VVC supports the joint coding of chroma residual (JCCR) tool where the chroma residuals are coded jointly. The usage (activation) of the JCCR mode is indicated by a TU-level flag tu_joint_cher_residual_flag and the selected mode is implicitly indicated by the chroma CBFs. The flag tu_joint_cher_residual_flag is present if either or both chroma CBFs for a TU are equal to 1. In the PPS (Picture Parameter Set) and slice header, chroma QP offset values are signaled for the JCCR mode to differentiate from the usual chroma QP offset values signaled for regular chroma residual coding mode. These chroma QP offset values are used to derive the chroma QP values for some blocks coded using the JCCR mode. The JCCR mode has 3 sub-modes. When a corresponding JCCR sub-mode (sub-mode 2 in Table 1) is active in a TU, this chroma QP offset is added to the applied luma-derived chroma QP during quantization and decoding of that TU. For the other JCCR sub-modes (sub-modes 1 and 3 in Table 1), the chroma QPs are derived in the same way as for conventional Cb or Cr blocks. The reconstruction process of the chroma residuals (resCb and resCr) from the transmitted transform blocks is depicted in Table 1. When the JCCR mode is activated, one single joint chroma residual block (resJointC[x][y] in Table 1) is signaled, and residual block for Ch (resCb) and residual block for Cr (resCr) are derived considering information such as tu_cbf_cb, tu_cbf_cr, and CSign, which is a sign value specified in the slice header.

At the encoder side, the joint chroma components are derived as explained in the following. Depending on the mode (listed in the tables above), resJointC{1,2} are generated by the encoder as follows:

If mode is equal to 2 (single residual with reconstruction Cb=C, Cr=CSign*C), the joint residual is determined according to $$resJointC[x][y] = (resCb[x][y] + CSign * resCr[x][y])/2$$

Otherwise, if mode is equal to 1 (single residual with reconstruction Cb=C, Cr=(CSign*C)/2), the joint residual is determined according to $$resJointC[x][y] = (4 * resCb[x][y] + 2 * CSign * resCr[x][y])/5$$

Otherwise (mode is equal to 3, i.e., single residual, reconstruction Cr=C, Cb=(CSign*C)/2), the joint residual is determined according to $$resJointC[x][y] = (4 * resCr[x][y] + 2 * CSign * resCb[x][y])/5$$

TABLE 1

Reconstruction of chroma residuals. The value CSign is a sign value (+1 or −1), which is specified in the slice header, resJointC[ ][ ] is the transmitted residual.

| tu_cbf_cb | tu_cbf_cr | reconstruction of Cb and Cr residuals | mode |
|---|---|---|---|
| 1 | 0 | resCb[x][y] = resJointC[x][y] resCr[x][y] = (CSign * resJointC[x][y]) >> 1 | 1 |
| 1 | 1 | resCb[x][y] = resJointC[x][y] resCr[x][y] = CSign * resJointC[x][y] | 2 |
| 0 | 1 | resCb[x][y] = (CSign * resJointC[x][y]) >> 1 resCr[x][y] = resJointC[x][y] | 3 |

The three joint chroma coding sub-modes described above are only supported in I slices. In P and B slices, only mode 2 is supported. Hence, in P and B slices, the syntax element tu_joint_cbcr_residual_flag is only present if both chroma cbfs are 1.

The JCCR mode can be combined with the chroma transform skip (TS) mode (more details of the TS mode can be found in Section 3.9.3 of JVET-T2002). To speed up the encoder decision, the JCCR transform selection depends on whether the independent coding of Cb and Cr components selects the DCT-2 or the TS as the best transform, and whether there are non-zero coefficients in independent chroma coding. Specifically, if one chroma component selects DCT-2 (or TS) and the other component is all zero, or both chroma components select DCT-2 (or TS), then only DCT-2 (or TS) will be considered in JCCR encoding. Otherwise, if one component selects DCT-2 and the other selects TS, then both, DCT-2 and TS, will be considered in JCCR encoding.

CCLM (Cross Component Linear Model)

The main idea behind CCLM mode (sometimes abbreviated as LM mode) is as follows: chroma components of a block can be predicted from the collocated reconstructed luma samples by linear models whose parameters are derived from already reconstructed luma and chroma samples that are adjacent to the block.

In VVC, the CCLM mode makes use of inter-channel dependencies by predicting the chroma samples from reconstructed luma samples. This prediction is carried out using a linear model in the form $$P(i, j) = a \cdot rec'_L(i, j) + b. \quad (1)$$

Here, P(i,j) represents the predicted chroma samples in a CU and $$rec'_L(i, j)$$

represents the reconstructed luma samples of the same CU which are down-sampled for the case of non-4:4:4 color format. The model parameters a and b are derived based on reconstructed neighboring luma and chroma samples at both encoder and decoder side without explicit signaling.

Three CCLM modes, i.e., CCLM_LT, CCLM_L, and CCLM_T, are specified in VVC. These three modes differ with respect to the locations of the reference samples that are used for model parameter derivation. Samples only from the top boundary are involved in the CCLM_T mode and samples only from the left boundary are involved in the CCLM_L mode. In the CCLM_LT mode, samples from both the top boundary and the left boundary are used.

Overall, the prediction process of CCLM modes consists of three steps:

1) Down-sampling of the luma block and its neighboring reconstructed samples to match the size of corresponding chroma block, 2) Model parameter derivation based on reconstructed neighboring samples, and 3) Applying the model equation (1) to generate the chroma intra prediction samples.

Down-sampling of the Luma Component: To match the chroma sample locations for 4:2:0 or 4:2:2: color format video sequences, two types of down-sampling filter can be applied to luma samples, both of which have a 2-to-1 down-sampling ratio in the horizontal and vertical directions. These two filters correspond to "type-0" and "type-2" 4:2:0 chroma format content, respectively and are given by $$f_1 = \begin{pmatrix} 0 & 1 & 0 \\ 1 & 4 & 1 \\ 0 & 1 & 0 \end{pmatrix}, \; f_2 = \begin{pmatrix} 1 & 2 & 1 \\ 1 & 2 & 1 \end{pmatrix}. \tag{2}$$

Based on the SPS-level flag information, the 2-dimensional 6-tap (i.e., $f_2$) or 5-tap (i.e., $f_1$) filter is applied to the luma samples within the current block as well as its neighboring luma samples. The SPS-level refers to Sequence Parameter Set level. An exception happens if the top line of the current block is a CTU boundary. In this case, the one-dimensional filter [1, 2, 1]/4 is applied to the above neighboring luma samples in order to avoid the usage of more than one luma line above the CTU boundary.

Figure 7:
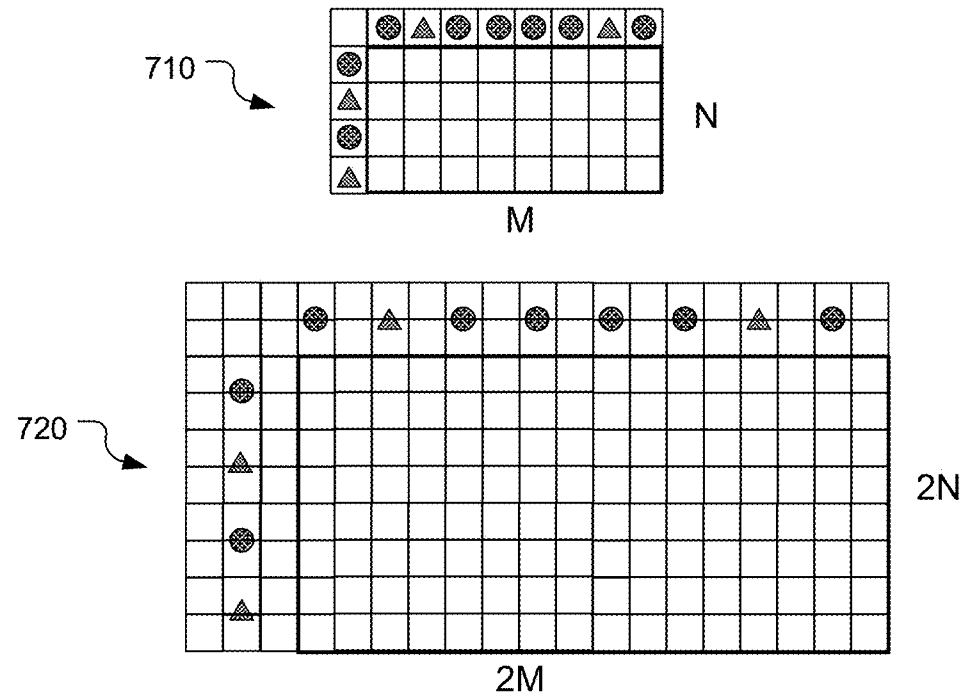
FIG. 7 shows the relative sample locations of M×N chroma block, the corresponding 2M×2N luma block and their neighboring samples (shown as filled circles and triangles) of "type-0" content.

Model Parameter Derivation Process: The model parameters a and b from eqn. (1) are derived based on reconstructed neighboring luma and chroma samples at both encoder and decoder sides to avoid the need for any signaling overhead. In the initially adopted version of the CCLM mode, the linear minimum mean square error (LMMSE) estimator was used for derivation of the parameters. In the final design, however, only four samples are involved to reduce the computational complexity. FIG. 7 shows the relative sample locations of M×N chroma block 710, the corresponding 2M×2N luma block 720 and their neighboring samples (shown as filled circles and triangles) of "type-0" content.

In the example of FIG. 7, the four samples used in the CCLM_LT mode are shown, which are marked by triangular shape. They are located at the positions of M/4 and M·3/4 at the top boundary and at the positions of N/4 and N·3/4 at the left boundary. In CCLM_T and CCLM_L modes, the top and left boundary are extended to a size of (M+N) samples, and the four samples used for the model parameter derivation are located at the positions (M+N)/8, (M+N)·3/8, (M+N)·5/8, and (M+N)·7/8.

Once the four samples are selected, four comparison operations are used to determine the two smallest and the two largest luma sample values among them. Let $X_l$ denote the average of the two largest luma sample values and let $X_s$ denote the average of the two smallest luma sample values. Similarly, let $Y_l$ and $Y_s$ denote the averages of the corresponding chroma sample values. Then, the linear model parameters are obtained according to the following equation:

$$a = \frac{Y_l - Y_s}{X_l - X_s} \tag{3}$$

$$b = Y_{s-a} \cdot X_s.$$

In this equation, the division operation to calculate the parameter a is implemented with a look-up table. To reduce the memory required for storing this table, the diff value, which is the difference between the maximum and minimum values, and the parameter a are expressed by an exponential notation. Here, the value of diff is approximated with a 4-bit significant part and an exponent. Consequently, the table for 1/diff only consists of 16 elements. This has the benefit of both reducing the complexity of the calculation and decreasing the memory size required for storing the tables.

MMLM Overview

As indicated by the name, the original CCLM mode employs one linear model for predicting the chroma samples from the luma samples for the whole CU, while in MMLM (Multiple Model CCLM), there can be two models. In MMLM, neighboring luma samples and neighboring chroma samples of the current block are classified into two groups, each group is used as a training set to derive a linear model (i.e., particular α and β are derived for a particular group). Furthermore, the samples of the current luma block are also classified based on the same rule for the classification of neighboring luma samples.

Threshold is calculated as the average value of the neighboring reconstructed luma samples. A neighboring sample with Rec'L[x,y]<=Threshold is classified into group 1; while a neighboring sample with Rec'L[x,y] >Threshold is classified into group 2.

Correspondingly, a prediction for chroma is obtained using linear models:

$$\begin{cases} Pred_C[x, y] = \alpha_1 \times Rec'_L[x, y] + \beta_1 & \text{if } Rec'_L[x, y] \le \text{Threshold} \\ Pred_C[x, y] = \alpha_2 \times Rec'_L[x, y] + \beta_2 & \text{if } Rec'_L[x, y] > \text{Threshold} \end{cases}$$

Chroma DM (Derived Mode) Mode

For Chroma DM mode, the intra prediction mode of the corresponding (collocated) luma block covering the centre position of the current chroma block is directly inherited.

Reconstructed Neighboring Sample Pre-Processing

When deriving model parameters, reconstructed neighboring samples for the first component and second component are used. Take the CCLM described in the overview section as an example. The first component is luma and the second component is cb or cr. To improve the model performance, the reconstructed neighboring samples are pre-processed before becoming the inputs for deriving model parameters.

Figure 8:
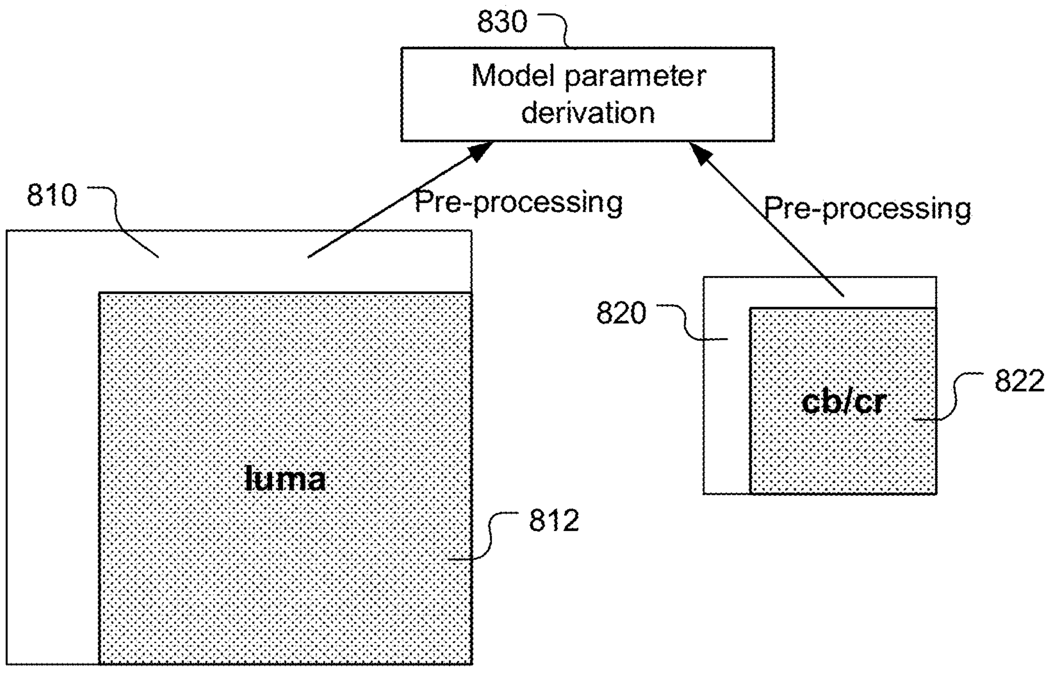
FIG. 8 illustrates an example of the reconstructed neighboring samples pre-processed before being becoming the inputs for deriving model parameters.

FIG. 8 illustrates an example of the reconstructed neighboring samples pre-processed before being becoming the inputs for deriving model parameters, where a neighboring region 810 of a luma block 812 and a neighboring region 820 of a chroma (cb or cr) block 812 are pre-processed before being provided to the model parameter derivation block 830.

In one embodiment, the reconstructed neighboring samples of the first component are pre-processed.

In one embodiment, the reconstructed neighboring samples of the second component are pre-processed.

In another embodiment, the reconstructed neighboring samples of only one of the first and the second component are pre-processed.

In one embodiment, the pre-processing methods can be (but are not limited to) any one or any combination of following processes: 3×3 or 5×5 filtering, biasing, clipping, filtering or clipping like ALF or CCALF, SAO-like filtering, filter sets (e.g. ALF sets)

In another embodiment, the first component is any one of luma, cb, and cr. For example, when the first component is luma, the second component is cb or cr. For another example, when the first component is cb, the second component is luma or cr. For another example, when the first component is cr, the second component is luma or cb. For another example, when the first component is luma, the second component is based on weighted combination of cb and cr.

In one embodiment, the pre-processing method of one component (e.g. cr) depends on another component (e.g. cb). For example, the selection of pre-processing method for cb is derived according to signaling/bitstream and cr follows cb's selection. For another example, it is assumed that high correlation exists between cb and cr, so the selection of pre-processing method for cr is shown as follows:

- The cb reconstruction (without pre-processing) plus cb residuals are treated as golden (i.e., a target to guide the process)
- Choosing cr's pre-processing method according to cb's pre-processed reconstruction and golden
- For example, if the cb's pre-processed reconstruction is very similar to golden, use cb's pre-processing method as cr's pre-processing method.

In another embodiment, the pre-processing method is applied right after reconstructing neighboring samples of the first and/or second component.

In another embodiment, the pre-processing method is applied to the reconstructed neighboring samples before generating the model parameters for the current block.

Prediction Sample Post-Processing

After applying CCLM to the current block, the prediction of the current block is generated and can be further adjusted with post-processing methods. The post-processing methods can be (but are not limited to) any one or any combination of following processes: 3×3 or 5×5 filtering, biasing, clipping, filtering or clipping like ALF or CCALF, SAO-like filtering, filter sets (e.g. ALF sets).

In one embodiment, the current block refers to luma, cb and/or cr. For example, when LM (e.g. proposed inverse LM described in a later section of this disclosure) is used to generate luma prediction, the post-processing is applied to luma. For another example, when CCLM is used to generate chroma prediction, the post-processing is applied to chroma.

In another embodiment, when the block size (width and/or height) is larger than a threshold, the post-processing is applied.

In another embodiment, the post-processing method of one component (e.g. cr) depends on another component (e.g. cb). For example, the selection of post-processing method for cb is derived according to signaling/bitstream and cr follows cb's selection. For another example, it is assumed that high correlation exists between cb and cr, so that the selection of post-processing method for cr is shown as follows:

- The cb prediction (without post-processing) plus cb residuals are treated as golden
- Choosing cr's post-processing method according to cb's post-processed prediction and golden
- For example, if the cb's post-processed prediction is very similar to the golden, use cb's post-processing method as cr's post-processing method.

Delta-Pred LM

A novel LM method is proposed in this section. Different from the CCLM as disclosed earlier in the background section, the inputs of deriving model parameters are the predicted samples (used as X) for the first component and the delta samples (used as Y) between reconstructed and predicted samples for the first component. The derived parameters and the initial predicted samples of the second component can decide the current predicted samples of the second component. For example, the predictors of cb and cr can be calculated based on:

$$delta\_cb=alpha*initial\_pred\_cb+beta,\quad pred\_cb=initial\_pred\_cb+delta\_cb,$$

$$delta\_cr=alpha*initial\_pred\_cr-beta,\quad pred\_cr=initial\_pred\_cr+delta\_cr.$$

For another example, the predictors of cb and cr can be calculated as:

$$delta\_cb=alpha*initial\_pred\_cb+beta,\quad pred\_cb=initial\_pred\_cb+delta\_cb,$$

$$delta\_cr=-alpha*initial\_pred\_cr+beta,\quad pred\_cr=initial\_pred\_cr+delta\_cr.$$

Embodiments for pred-reco LM can be used for delta-pred LM.

Pred-Reco LM

A novel LM method is proposed in this section. Different from the CCLM as disclosed earlier in the background section, the inputs of deriving model parameters are the predicted samples (used as X) for the first component and the reconstructed samples (used as Y) for the first component. The derived parameters and the initial predicted samples of the second component can decide the current predicted samples of the second component. For example, the predictors of cb and cr can be calculated based on:

$$Pred\_cb=alpha*initial\_pred\_cb+beta$$

$$Pred\_cr=alpha*initial\_pred\_cr-beta$$

For another example, the predictors of cb and cr can be calculated as $$Pred\_cb=alpha*initial\_pred\_cb+beta,$$

$$Pred\_cr=-alpha*initial\_pred\_cr+beta.$$

In one embodiment, the first component is luma and the second component is cb or cr.

In another embodiment, the first component is cb and the second component is cr.

In another embodiment, the first component is weighted cb and cr and the second component is luma, where inverse LM is applied. For example, the inputs of deriving model parameters are the weighted predictions of cb and cr and the weighted reconstructed samples of cb and cr.

In one sub-embodiment, the weight for (cb, cr) can be equal.

In another sub-embodiment, the weight for (cb, cr) can be (1, 3) or (3, 1). Take (3, 1) as an example, the weighting formula can be:

$$\text{weighted\_pred} = (3*\text{pred\_cb} + 1*\text{pred\_cr} + \text{offset}) >> 2,$$

$$\text{weighted\_reco} = (3*\text{reco\_cb} + 1*\text{reco\_cr} + \text{offset}) >> 2.$$

In another embodiment, the initial predicted samples of the second component are generated by chroma DM.

In another embodiment, the initial prediction samples of the second component are generated by one or more traditional intra prediction modes (e.g. angular intra prediction modes, DC, planar).

Joint LM

Different from CCLM as disclosed earlier in the background section, joint linear model is proposed to share a single model for chroma components (cb and cr).

In one embodiment, the parameters of the derived single model include alpha and beta. For example, the predictors of cb and cr can be calculated based on luma reconstructed samples and the parameters.

Pred_*cb*=alpha*reco_luma+beta,

Pred_*cr*=alpha*reco_luma−beta.

For another example, the predictors of cb and cr can be calculated as

Pred_*cb*=alpha*reco_luma+beta,

Pred_*cr*=−alpha*reco_luma+beta.

In another embodiment, when deriving model parameters, luma, cb, and cr are used. The luma parts are kept as original and the chroma parts are changed. For example, the cb's and cr's reconstructed neighboring samples are weighted before being the inputs of deriving model parameters. The weighted method can be any one or any combination of the methods to be described in section JCCLM-method 1/-method 2.

In another embodiment, when deriving model parameters, luma and one of chroma components are used. For example, luma and cb are used to decide model parameters.

In another embodiment, instead of using neighboring reconstructed samples, neighboring residuals are used for deriving model parameters. Then, the joint residuals of cb and cr are derived as follows:

$$resi_C(i, j) = a \cdot resi_L^{\prime(i,j)} + b$$

In one sub-embodiment, if JCCR is applied, LM parameters for Cb and Cr are the same (i.e., joint LM is applied).

In another sub-embodiment, the neighboring residuals for chroma are the weighted sum of neighboring cb and cr residuals.

In another sub-embodiment, if joint LM is applied, JCCR is inferred as enabled.

In another sub-embodiment, when joint LM is used, the prediction of current chroma block is generated by chroma DM mode.

In another sub-embodiment, when joint LM is used, an initial prediction of current chroma block is generated by chroma DM mode and the final prediction of current chroma block is generated based on the initial prediction and $resi_C$. (e.g. initial prediction+$resi_C$)

Residual LM

Instead of using neighboring reconstructed samples, neighboring residuals are used for deriving model parameters. Then, the joint residuals of current chroma block are derived as follows. (cb and cr have their own models, respectively.)

$$resi_C(i, j) = a \cdot resi_L^{\prime(i,j)} + b$$

In one embodiment, the prediction of current chroma block (denoted as pred_c) is generated by chroma DM and the reconstruction of current chroma block is formed by pred_c+resi_c.

In another embodiment, an initial prediction of current chroma block is generated by chroma DM mode and the final prediction of current chroma block is generated based on the initial prediction and $resi_C$. (e.g. initial prediction+$resi_C$).

JCCLM (JCCR with CCLM)—Method 1

JCCLM-mothod1 is proposed as a novel LM derivation scheme. Different from the CCLM as disclosed earlier in the background section, neighboring luma reconstructed samples and weighted reconstructed neighboring cb and cr samples are used as the inputs X and Y of model derivation. The derived model is called as JCCLM and the model parameters are called as JCCLM parameters in this disclosure. Then, JCCLM predictors are decided according to JCCLM parameters and reconstructed samples of the collocated luma block. Finally, the predictions for cb and cr are calculated by the JCCLM predictors.

In one embodiment, the weighting for generating weighted reconstructed neighboring cb and cr samples can be (1, −1) for (cb, cr).

In another embodiment, the weighting for generating weighted reconstructed neighboring cb and cr samples can be (½, ½) for (cb, cr).

In another embodiment, the predictions for cb and cr are calculated as follows:

$$\text{pred\_cb} = 1*\text{JCCLM\_predictor},\ \text{pred\_cr} = -1*\text{JCCLM\_predictor} + k$$

In another sub-embodiment, k can be any positive value. For example, k=512.

In another sub-embodiment, k varies with the bit depth. For example, if the bit depth is 10, k=512.

In another sub-embodiment, k is pre-defined in the standard or depends on the signaling at block, SPS, PPS, and/or picture level.

In another embodiment, the predictions for cb and cr are calculated as follows:

$$\text{pred\_cb} = 1*\text{JCCLM\_predictor},\ \text{pred\_cr} = 1*\text{JCCLM\_predictor}.$$

In another embodiment, when the weighting for generating weighted reconstructed neighboring cb and cr samples is (1, −1) for (cb, cr), the predictions for cb and cr are calculated as follows:

$$\text{pred\_cb} = 1*\text{JCCLM\_predictor},\ \text{pred\_cr} = -1*\text{JCCLM\_predictor} + k$$

In the above equation, the value of k can reference the sub-embodiments mentioned above. In another embodiment, when the weighting for generating weighted reconstructed neighboring cb and cr samples is (½, ½) for (cb, cr), the predictions for cb and cr are calculated as follows.

$$pred\_cb = 1 * JCCLM\_predictor,\ pred\_cr = 1 * JCCLM\_predictor$$

In another embodiment, when JCCLM is applied, residual coding use JCCR automatically.

JCCLM (JCCR with CCLM)—Method 2

JCCLM-method 2 is proposed as a novel LM derivation scheme. Different from the CCLM as disclosed earlier in the background section, two models are used for generating prediction of the current block. The derivation process of the two models and their corresponding predictors are shown below:

- JCCLM: Neighboring luma reconstructed samples and weighted reconstructed neighboring cb and cr samples are used as the inputs X and Y of model derivation. The derived model is called as JCCLM and the model parameters are called as JCCLM parameters in this disclosure. Then, JCCLM predictors are decided according to JCCLM parameters and reconstructed samples of the collocated luma block.
- Cb_CCLM: Neighboring luma reconstructed samples and neighboring cb reconstructed samples are used as the inputs X and Y of model derivation. The derived model is called as cb_CCLM and the model parameters are called as cb_CCLM parameters in this disclosure. Then, cb_CCLM predictors are decided according to cb_CCLM parameters and reconstructed samples of the collocated luma block.

Finally, the predictions for cb and cr are calculated by the JCCLM predictors and cb_CCLM predictors. FIG. 9 illustrates an example of the relationship between the cr prediction 910, cb prediction 920 and JCCLM predictors 930.

In one embodiment, the weighting for generating weighted reconstructed neighboring cb and cr samples can be (½, ½) for (cb, cr).

In another embodiment, the prediction for cb is calculated as follows:

$$pred\_cb = cb\_CCLM\_predictors.$$

In another embodiment, the prediction for cr is calculated as follows:

$$pred\_cr = 2 * JCCLM\_predictor - cb\_CCLM\_predictor$$

In another embodiment, when JCCLM is applied, residual coding uses JCCR automatically.

Multiple-Hypothesis of CCLM Prediction

In addition to CCLM as disclosed earlier in the background section (for cb, deriving model parameters from luma and cb; for cr, deriving model parameters from luma and cr), more CCLM variations are disclosed. The following shows some examples.

In one variation, cr prediction is derived by:

- Deriving model parameters by using neighboring reconstructed samples of cb and cr as the inputs X and Y of model derivation
- Then generating cr prediction by the derived model parameters and cb reconstructed samples.

In another variation, MMLM is used.

In yet another variation, model parameters for cb (or cr) prediction are derived from multiple collocated luma blocks.

Each CCLM method is suitable for different scenarios. For some complex features, the combined prediction may result in better performance. Therefore, multiple-hypothesis CCLM is disclose to blend the predictions from multiple CCLM methods. The to-be-blended CCLM methods can be from (but are not limited to) the above mentioned CCLM methods. A weighting scheme is used for blending.

In one embodiment, the weights for different CCLM methods are pre-defined at encoder and decoder.

In another embodiment, the weights vary based on the distance between the sample (or region) positions and the reference sample positions.

In another embodiment, the weights depend on the neighboring coding information.

In another embodiment, a weight index is signaled/parsed. The code words can be fixed or vary adaptively. For example, the code words vary with template-based methods.

Adaptive Intra-Mode Selection

With improvement of video coding, more coding tools are created. The syntax overhead of selecting a coding tool becomes an issue. Several straightforward methods can be used to reduce the syntax overhead. For example, a large block can use the same coding mode. In another example, multiple components (e.g. cb and cr) can share the same coding mode.

However, with these straightforward methods, the accuracy/performance for intra prediction decreases. The possible reasons may be following:

- Intra prediction is highly related to neighboring reference samples. When the whole block uses a single intra prediction mode, the intra prediction mode may be suitable for those samples which are close to the reference samples but may not be good for those samples which are far away from the reference samples.
- when processing cr, the reconstructions of cb and luma were generated and can be used to choose the coding mode for cr.

In this section, it is proposed to adaptively change the intra prediction mode for one or more sample(s) or subblock(s) within the current block according to previous coding/decoding of components.

In one embodiment, with the reconstruction of the previously encoded/decoded components, the performance for the different coding modes is decided. Then, the better mode is used for the rest component(s) (subsequently encoded and decoded component(s)). For example, for cb, if the prediction from traditional intra prediction modes (e.g. angular intra prediction modes, DC, planar) is better than the prediction from LM mode. (e.g. "better" means similar to cb's reconstruction.) Then, the traditional intra prediction mode is preferable for cr.

In one sub-embodiment, the proposed method can be subblock based. For example, a chroma block is divided into several sub-blocks. For each subblock, if for cb, the subblock's prediction from LM mode is better than the subblock's prediction from traditional intra prediction modes (e.g. angular intra prediction modes, DC, planar). (e.g. "better" means similar to cb's reconstruction and reducing the cb's residual), then the LM mode is preferable for the corresponding subblock of cr. An example is shown in FIG. 10, where the chroma block is divided into 4 sub-blocks. If sub-blocks 1 and 2 of cb block 1010 have better prediction results using LM mode, then sub-blocks 1 and 2 of cr block 1020 also use LM mode.

In another embodiment, the adaptive changing rule can be performed at both encoder and/or decoder and doesn't need an additional syntax.

Inverse LM

For the CCLM mode as disclosed earlier in the background section, luma reconstructed samples are used to derive the predictors in the chroma block. In this disclosure, inverse LM is proposed to use chroma information to derive the predictors in the luma block. When supporting inverse LM, chroma are encoded/decoded (signaled/parsed) before luma.

In one embodiment, the chroma information refers to the chroma reconstructed samples. When deriving model parameters for inverse LM, reconstructed neighboring chroma samples are used as X and reconstructed neighboring luma samples are used as Y. Moreover, the reconstructed samples in the chroma block (collocated to the current luma block) and the derived parameters are used to generate the predictors in the current luma block. An alternative way is that "information" in this embodiment can refer to predicted samples.

In one embodiment, chroma refers to cb and/or cr component(s).

In one sub-embodiment, only one of cb's and cr's information is used.

In another sub-embodiment, the chroma information is from both cb and cr. For example, the neighboring reconstructed cb and cr samples are weighted and then used as the inputs of deriving model parameters. In another example, the reconstructed cb and cr samples in the chroma block (collocated with the current luma block) are weighted and then used to derive the predictors in the current luma block.

In another embodiment, for the current luma block, the prediction (generated by the proposed inverse LM) can be combined with one or more hypotheses of predictions (generated by one or more other intra prediction modes).

In one sub-embodiment, "other intra prediction modes" can refer to angular intra prediction modes, DC, planar, MIP, ISP, MRL, any other existing intra modes (supported in HEVC/VVC) and/or any other intra prediction modes.

In another sub-embodiment, when combining multiple hypotheses of predictions, weighting for each hypothesis can be fixed or adaptively changed. For example, equal weights are applied to each hypothesis. In another example, weights vary with neighboring coding information, sample position, block width, height, prediction mode or area. Some examples of neighboring coding information usage are shown as follows:

- One possible rule related to sample position is described as follows.
  - When the sample position is further away from the reference samples, the weight for the prediction from other intra prediction modes decreases.
- Another possible rule related to neighboring coding information is described as follows.
  - When more neighboring blocks (left, above, left-above, right-above, and/or left-bottom) are coded with a particular (e.g. Mode A), the weight for the prediction from Mode A gets higher.
- Another possible rule related to sample position is described as follows.
  - The current block is partitioned into several regions. The sample positions in the same region share the same weighting. If the current region is close to the reference L neighbor, the weight for prediction from other intra prediction modes is higher than the weight for prediction from CCLM. The following shows some possible ways to partition the current block. (as the dotted lines in the FIGS. 11A-C):
    - FIG. 11A (ratio of width and height close to or exactly 1:1): The distance between the current region and the left and top reference L neighbor is considered.
    - FIG. 11B (width>n*height, where n can be any positive integer): The distance between the current region and the top reference L neighbor is considered.
    - FIG. 11C (height>n*width, where n can be any positive integer): The distance between the current region and the left reference L neighbor is considered.

CCLM for Inter Block

In the overview section, CCLM is used for intra blocks to improve chroma intra prediction. For an inter block, chroma prediction may be not as accurate as luma. Possible reasons are listed below:

- Motion vectors for chroma components are inherited from luma, (Chroma doesn't have its own motion vectors.)
- Less coding tools are designed to improve inter chroma prediction.

Therefore, CCLM is proposed as an alternative way to code inter blocks. With this proposed method, chroma prediction according to luma for an inter block can be improved. According to CCLM for inter block, the corresponding luma block is coded in the inter mode, i.e., using motion compensation and one or more motion vectors to access previous reconstructed luma blocks in one or more previously coded reference frames. Cross-color linear mode based on this inter-coded luma may provide better prediction than the inter prediction based on previous reconstructed chroma blocks in one or more previously coded reference frames. The CCLM for intra mode has been described in the background section. The CCLM process described earlier can be applied here. However, while the conventional CCLM utilizes a reconstructed luma block in the same frame as the chroma block, CCLM inter mode utilizes a reconstructed or predicted luma block derived from the reconstructed luma blocks in one or more previously coded reference frames.

In one embodiment, for chroma components, in addition to original inter prediction (generated by motion compensation), one or more hypotheses of predictions (generated by any cross-color tools such as CCLM and/or any other LM modes) are used to form the current prediction.

In one sub-embodiment, the current prediction is the weighted sum of inter prediction and CCLM prediction. Weights are designed according to neighboring coding information, sample position, block width, height, mode or area. Some examples are shown as follows:

- In one example, for a small block (e.g. area<threshold), weights for CCLM prediction are higher than weights for inter prediction.
- In another example, when most neighboring coded blocks are intra blocks, weights for CCLM prediction are higher than weights for inter prediction.
- In yet another example, weights are fixed values for the whole block.

In another embodiment, original inter prediction (generated by motion compensation) is used for luma and the predictions of chroma components are generated by CCLM and/or any other LM modes.

In one sub-embodiment, the current CU is viewed as an inter CU, intra CU, or a new type of prediction mode (neither intra nor inter).

The above proposed methods can be also applied to IBC blocks. ("inter" in this section can be changed to IBC.) That is, for chroma components, the block vector prediction can be combined or replaced with CCLM prediction.

Cross-CU LM

Compared with traditional intra prediction modes (e.g. angular intra prediction modes, DC, and planar), the benefit from LM mode is to predict irregular patterns as shown in FIG. 12, where the block has an irregular pattern that no angular intra prediction can provide a good prediction. However, the luma block 1210 can provide a good prediction for the chroma block 1220 using LM mode.

For encoding/decoding of irregular patterns in an inter picture, the distribution of intra and inter coding modes may look as follows. For some regions (highly related to neighbor), intra mode is used. For other regions, inter mode is preferable.

To handle the situation shown as above, a cross-CU LM mode is proposed. Based on the observation of current CU's ancestor node, LM mode is applied. For example, if the ancestor node contains irregular patterns (e.g. partial intra with partial inter), the blocks belonging to this ancestor node are encoded/decoded with LM mode. With the proposed method, the CU-level on/off flag for LM mode is not required. FIG. 13 illustrates an example that a luma picture area associated with a node contains irregular patterns. The area associated with the node is partitioned into luma blocks according to the irregular patterns. The luma blocks (the dashed-line blocks) that the irregular patterns occupy a noticeable portion of the blocks processed as intra blocks; and otherwise the luma blocks (the dotted-line blocks) are processed as inter luma blocks.

In one embodiment, the block-level on/off flag for LM mode is defined/signaled at the ancestor node level. For example, when the flag at the ancestor node indicates the cross-CU LM is enabled, the CUs belongs to (i.e., those partitioned from) the ancestor node use LM. In another example, when the flag at the ancestor node indicates the cross-CU LM is disabled, the CUS belongs to (i.e., those partitioned from) the ancestor node do not use LM.

In another embodiment, the ancestor node refers to a CTU.

In another embodiment, whether to enable cross-CU LM is implicitly derived according to the analysis of ancestor node's block properties.

In this section, CU can be changed to any block. For example, it can be PU.

LM Assisted Angular/Planar Mode

For traditional intra prediction modes (e.g. angular intra prediction modes, DC, and planar), the reference samples are from top and left neighboring reconstructed samples. Therefore, the accuracy of intra prediction decreases for right-bottom samples within the current block. In this section, LM is used to improve the prediction from traditional intra prediction modes.

In one embodiment, the current block's prediction is formed by a weighted sum of one or more hypotheses of predictions from traditional intra prediction mode(s) and one or more hypotheses of predictions from LM mode(s). In one sub-embodiment, equal weights are applied to both. In another sub-embodiment, weights vary with neighboring coding information, sample position, block width, height, mode or area. For example, when the sample position is far away from the top-left region, the weight for the prediction from traditional intra prediction modes decreases. More weighting schemes can reference "inverse LM" section.

In another embodiment, it is proposed to use LM mode to generate the right-bottom region within or near the current block. When doing intra prediction, the reference samples can be based on not only original left and top neighboring reconstructed samples but also proposed right and bottom LM-predicted samples. The following shows an example.

- Before doing intra prediction for a chroma block, the collocated luma block is reconstructed.
- "The neighboring luma reconstructed samples of the collocated luma block" and "the neighboring chroma reconstructed samples of the current chroma block" are used for deriving LM parameters.
- "The reconstructed samples of the collocated luma block" with the derived parameters are used for obtaining the right-bottom LM-predicted samples of the current chroma block. Right-bottom region of the current chroma block can be any subset of the region in FIGS. 14A-B. FIG. 14A illustrates an example where the right-bottom region 1412 is outside the current chroma block 1410. FIG. 14B illustrates an example where the right-bottom region 1422 is outside the current chroma block 1420.
- The prediction of the current block is generated bi-directionally by referencing original L neighboring region (original top and left region, obtained using a traditional intra prediction mode) and the proposed inverse-L region (obtained using LM).

In one sub-embodiment, the predictors from the original top and left region and the predictors from bottom and left region are combined with weighting. In one example, equal weights are applied to both. In another example, weights vary with neighboring coding information, sample position, block width, height, mode or area. For example, when the sample position is far from the top and left region, the weight for the prediction from the traditional intra prediction mode decreases.

In another embodiment, this proposed method can be applied to inverse LM. Then, when doing luma intra prediction, the final prediction is bi-directional, which is similar to the above example for a chroma block.

In another embodiment, after doing segmentation to know the curve pattern for luma, the proposed LM assisted Angular/Planar Mode assists chroma with getting the correct curved angle.

The proposed methods in this disclosure can be enabled and/or disabled according to implicit rules (e.g. block width, height, or area) or according to explicit rules (e.g. syntax in block, slice, picture, SPS, or PPS level).

The term "block" in this disclosure can refer to TU/TB, CU/CB, PU/PB, or CTU/CTB.

The term "LM" in this disclosure can be viewed as one kind of CCLM/MMLM modes or any other extension/variation of CCLM (e.g. the proposed CCLM extension/variation in this disclosure).

The proposed methods (for CCLM) in this disclosure can be used for any other LM modes.

Any combination of the proposed methods in this disclosure can be applied.

Figure 1A:
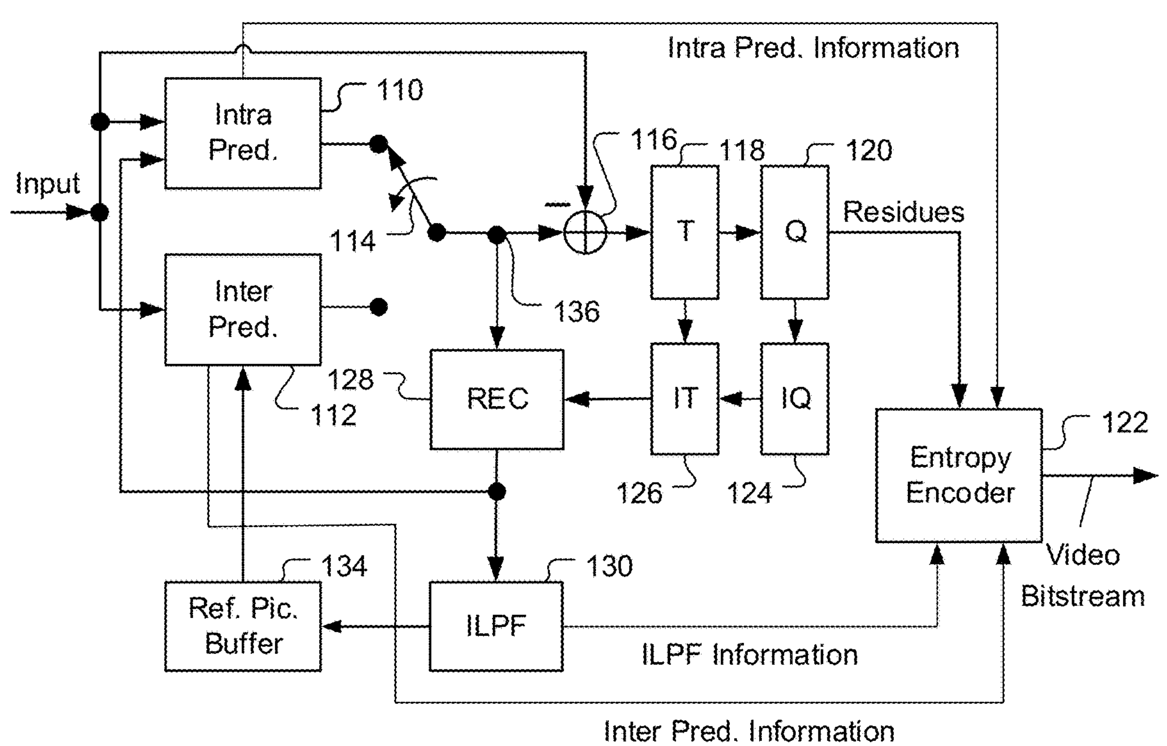
FIG. 1A illustrates an exemplary adaptive Inter/Intra video encoding system incorporating loop processing.
Figure 1B:
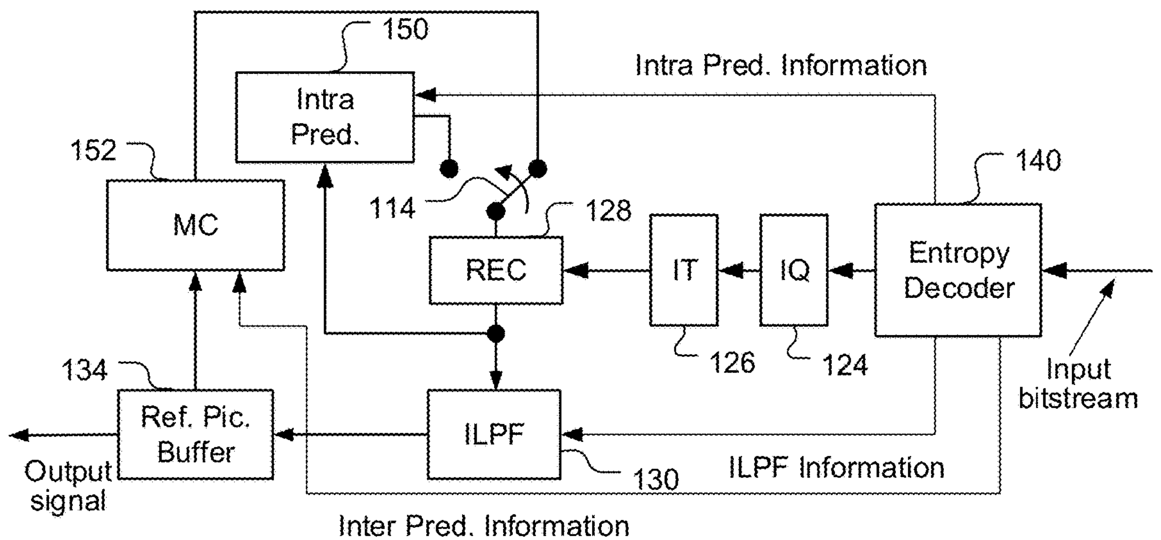
FIG. 1B illustrates a corresponding decoder for the encoder in FIG. 1A.

Any of the foregoing proposed methods can be implemented in encoders and/or decoders. For example, any of the proposed methods can be implemented in an intra/inter coding module (e.g. Intra Pred. 110 and Inter Pred. 112 in FIG. 1A) of an encoder, a motion compensation module (e.g., MC 152 in FIG. 1B), or a merge candidate derivation module of a decoder. Alternatively, any of the proposed methods can be implemented as a circuit coupled to the intra/inter coding module of an encoder and/or motion compensation module, a merge candidate derivation module of the decoder.

FIG. 15 illustrates a flowchart of an exemplary video coding system that utilizes cross-color linear model for inter mode according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block comprising a first-color block and a second-color block are received in step 1510, wherein the input data comprises pixel data for the current block to be encoded at an encoder side or encoded data associated with the current block to be decoded at a decoder side, and wherein the first-color block is coded in a non-intra block mode. One or more model parameters of one or more cross-color models for the second-color block are determined in step 1520. Cross-color predictors for the second-color block is determined in step 1530, wherein one cross-color predictor value for the second-color block is generated for each second-color pixel of the second-color block by applying said one or more cross-color models to corresponding reconstructed or predicted first-color pixels. In step 1540, the input data associated with the second-color block is encoded using prediction data comprising the cross-color predictors for the second-color block at the encoder side, or decoding the input data associated with the second-color block is decoded using the prediction data comprising the cross-color predictors for the second-color block at the decoder side.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of inter prediction for color pictures, the method comprising:

receiving input data associated with a current block comprising a first-color block and a second-color block, wherein the input data comprises pixel data for the current block to be encoded at an encoder side or encoded data associated with the current block to be decoded at a decoder side, and wherein the first-color block is coded in a non-intra block mode, wherein the current block corresponds to an inter CU (Coding Unit) or corresponds to an IBC (Intra Block Copy) CU;

determining one or more model parameters of one or more cross-color models for the second-color block;

determining cross-color predictors for the second-color block, wherein one cross-color predictor value for the second-color block is generated for each second-color pixel of the second-color block by applying said one or more cross-color models to corresponding reconstructed or predicted first-color pixels; and encoding the input data associated with the second-color block using prediction data comprising the cross-color predictors for the second-color block at the encoder side or decoding the input data associated with the second-color block using the prediction data comprising the cross-color predictors for the second-color block at the decoder side.

2. The method of claim 1, wherein the prediction data further comprises second-color inter prediction data based on reconstructed second-color data in a previously coded reference picture.

3. The method of claim 2, wherein the prediction data are generated as a weighted sum of the cross-color predictors and the second-color inter prediction data.

4. The method of claim 3, wherein weighting for the weighted sum is determined according to neighboring coding information, sample position, block width, block height, block area, block mode or a combination thereof.

5. The method of claim 4, wherein a weight of the cross-color predictors is higher than the weight of the second-color inter prediction data if a block size is smaller than a threshold.

6. The method of claim 4, wherein a weight of the cross-color predictors is higher than the weight of the second-color inter prediction data if a majority of neighboring blocks of the current block is coded in an intra mode.

7. The method of claim 4, wherein the weighting corresponds to fixed weights for the current block.

8. The method of claim 1, wherein at least one of the cross-color models is a linear model (LM).

9. The method of claim 1, wherein the model parameters are determined based on neighboring reconstructed first-color pixels of a collocated first-color block associated with the second-color block and neighboring reconstructed second-color pixels of the second-color block.

10. The method of claim 9, wherein the neighboring reconstructed first-color pixels of the collocated first-color block correspond to top neighboring samples of the collocated first-color block, left neighboring samples of the collocated first-color block, or both.

11. The method of claim 1, wherein the prediction data is selected from a pre-defined set including the cross-color predictors.

12. The method of claim 1, wherein the prediction data further comprise second-color prediction data based on IBC (Intra Block Copy) mode.

13. The method of claim 1, wherein the first-color block corresponds to a luma block and the second-color block corresponds to a chroma block.

14. An apparatus for inter prediction for color pictures, the apparatus comprising one or more electronics or processors arranged to:

receive input data associated with a current block comprising a first-color block and a second-color block, wherein the input data comprises pixel data for the current block to be encoded at an encoder side or encoded data associated with the current block to be decoded at a decoder side, and wherein the first-color block is coded in a non-intra block mode, wherein the current block corresponds to an inter CU (Coding Unit) or corresponds to an IBC (Intra Block Copy) CU;

determine one or more model parameters of one or more cross-color models for the second-color block;

determine cross-color predictors for the second-color block, wherein one cross-color predictor value for the second-color block is generated for each second-color pixel of the second-color block by applying said one or more cross-color models to corresponding reconstructed or predicted first-color pixels; and encode the input data associated with the second-color block using prediction data comprising the cross-color predictors for the second-color block at the encoder side or decode the input data associated with the second-color block using the prediction data comprising the cross-color predictors for the second-color block at the decoder side.

* * * * *